United States Patent [19]

Femiani

[11] Patent Number: 5,238,473
[45] Date of Patent: Aug. 24, 1993

[54] ROTATING AIR FILTER CLEANING ARRANGEMENT

[76] Inventor: J. Paul Femiani, 1717 S. Stafford St., Arlington, Va. 22204

[21] Appl. No.: 909,338

[22] Filed: Jul. 6, 1992

[51] Int. Cl.$^5$ ............................................. B01D 46/38
[52] U.S. Cl. ........................................ 55/290; 55/400
[58] Field of Search ...................... 55/290, 293, 400

[56] References Cited

U.S. PATENT DOCUMENTS

| | | | |
|---|---|---|---|
| 1,493,789 | 5/1924 | Mullen | 55/290 |
| 4,009,011 | 2/1977 | Ross | 55/290 |
| 4,036,613 | 7/1977 | Brown et al. | 55/294 |
| 4,203,738 | 5/1980 | Kerman | 55/287 |
| 4,373,939 | 2/1983 | Limbocker | 55/287 |
| 4,689,055 | 8/1987 | Kochan | 55/96 |
| 4,725,292 | 2/1988 | Williams | 55/96 |
| 4,971,026 | 11/1990 | Fineblum | 55/290 |

Primary Examiner—Bernard Nozick
Attorney, Agent, or Firm—Henderson & Sturm

[57] ABSTRACT

A rotary filter cleaning arrangement (10) for air ducts (100) having a generally rectangular cross-sectional configuration; wherein, the arrangement includes a generally circular filter member (40) mounted for rotary movement on the output shaft (21) of a drive motor (20) suspended from a framework member (30) having a central aperture (32); wherein, the filter member (40) is suspended over the central aperture (32) and cleaned by a radially disposed vacuum arm member (50).

7 Claims, 1 Drawing Sheet

ROTATING AIR FILTER CLEANING ARRANGEMENT

TECHNICAL FIELD

This invention relates to the field of air filtration in general and in particular to a rotating filter arrangement wherein the filter element is moved past a vacuum cleaning station.

BACKGROUND ART

As can be seen by reference to the following U.S. Pat. Nos. 4,036,613; 4,203,738; 4,373,939; and 4,725,292; the prior art is replete with myriad and diverse filter cleaning arrangements wherein the filter material is swept by a vacuum arm to prolong the useful life of the filter elements.

While all of the aforementioned prior art constructions are more than adequate for the basic purpose and function for which they have been specifically designed, these patented arrangements have almost always been employed in large commercial and industrial air handling environments; wherein the sheer physical size of the filters, virtually dictated the fact that the vacuum system be moved relative to a stationary filter array. Furthermore, only U.S. Pat. No. 4,725,292 even remotely suggests moving a rotatable filter relative to a fixed vacuum arm.

To date no one has developed a lightweight compact self-cleaning vacuum system for residential and light commercial usage wherein a generally flat planar filter arrangement is rotated relative to a stationary vacuum station.

As a consequence of the foregoing situation, there has existed a longstanding need among homeowners and owners of relatively small commercial establishments for a quick simple and practical filter cleaning system that not only can be readily installed in existing duct work but which also increases the effective cleaning surface of the filter element; and, the provision of such a construction is a stated objective of the present invention.

DISCLOSURE OF THE INVENTION

Briefly stated, the rotating air filter cleaning arrangement that forms the basis of the present invention comprises a generally flat planar filter member rotatably disposed at an angular orientation within an air duct passageway; wherein, a radially disposed stationary vacuum arm extends from the periphery of the filter member to a point proximate the center of the filter member.

In addition the filter member is operatively connected to an axial drive member and the vacuum arm is operatively connected to a vacuum motor; wherein, an electrical control means is provided to simultaneously energize and de-energize the drive and vacuum motors to accomplish the rapid and efficient cleaning of the filter member.

As will be explained in greater detail further on in the specification, the axial drive member is further supported and suspended in a framework member having cowl portions which are secured to the four corners of the duct work to funnel the air into the passageway defined by the filter member; which has been angled relative to the longitudinal axis of the duct work to maximize the effective filtering surface area of the filter member.

BRIEF DESCRIPTION OF THE DRAWINGS

These and other attributes of the invention will become more clear upon a through study of the following description of the best for carrying out the invention, particularly when reviewed in conjunction with the drawings, wherein.

BEST MODE FOR CARRYING OUT THE INVENTION

Figure 2:
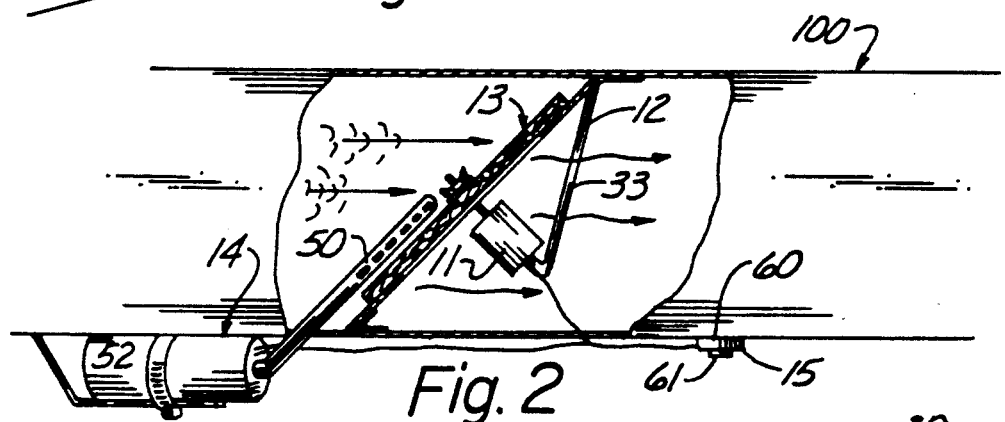
FIG. 2 is a side plan view of the apparatus.

As can be seen by reference to the drawings, and in particular to FIG. 2, the rotating filter cleaning arrangement that forms the basis of the present invention is designated generally by the reference numeral (10). The arrangement (10) comprises in general; a drive unit (11); a drive support unit (12); a filter unit (13) a vacuum unit (14) sand a control unit (15). These units will now be described in seriatim fashion.

Figure 4:
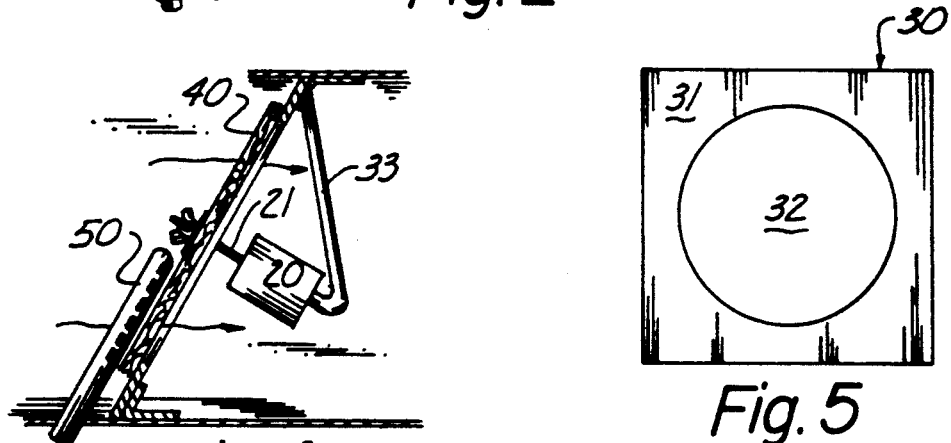
FIG. 4 is an enlarged side elevation view of portions of the apparatus.
Figure 6:
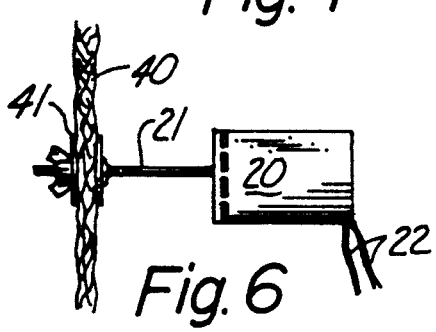
FIG. 6 is an enlarged detail view of the drive unit and filter unit.
Figure 7:
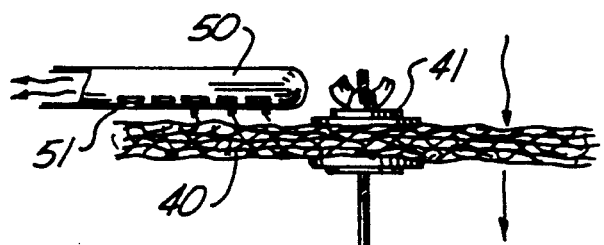
FIG. 7 is an enlarged detail view of the filter unit and vacuum unit.

As shown in FIGS. 2, 4 and 6 the drive unit (11) comprises a drive motor (20) having a axial output shaft (21) and electrical connector means (22) whose purpose and function will be explained further on in the specification.

Figure 1:
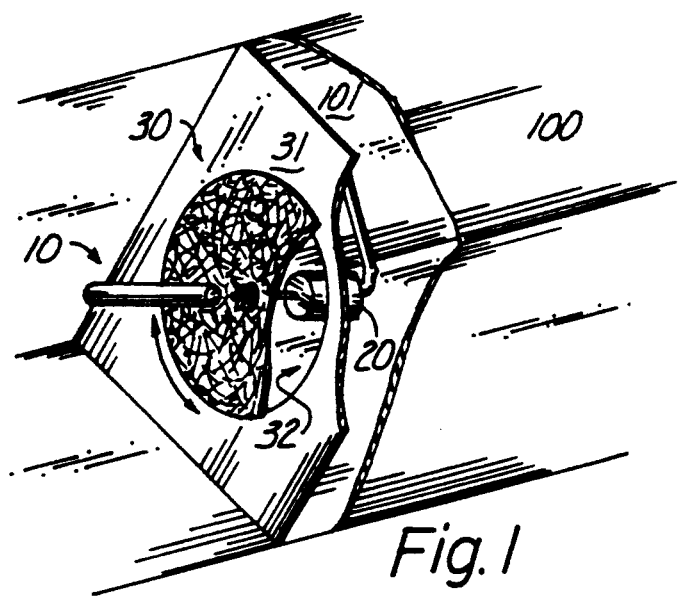
FIG. 1 is a perspective view of portions of the apparatus installed in a conventional air duct.
Figure 3:
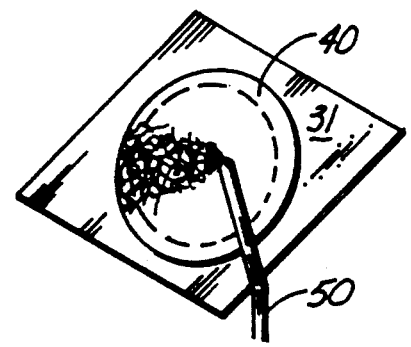
FIG. 3 is an isolated perspective view of the filter unit and vacuum unit.

Turning now to FIGS. 1, 3 and 4 it can be seen that the drive support unit (12) comprises a framework member (30) having a generally rectangular outer peripheral portion (31) which is operatively secured to the four corners of an air duct (100).

In addition the framework member (30) is provided with an enlarged generally circular central aperture (32); wherein, at lest one radially disposed support arm (33) projects towards the center of the aperture (32) to operatively engage and support the drive motor (20); such that the axial output shaft (21) is centrally disposed within the aperture (32) of the framework member (30), and in the preferred embodiment of FIGS. 1 through 4 intersects at an angle with the longitudinal axis of the air duct (100).

As can be seen particularly by reference to FIGS. 2 and 4, the framework member (30) is disposed at an acute angle relative to the interior of the air duct (100) for reasons that will be explained presently.

Turning now to FIGS. 2 through 7 it can be seen that the filter unit (13) comprises a generally thin flat filter member (40) having a generally circular configuration; wherein the diameter of the filter member (40) is approximately equal to, but greater than, the diameter of the central aperture (32) in the framework member (30). In addition the filter member (40) is further provided with a central hub element (41) having a discrete aperture that is dimensioned to receive the output shaft (21) of the drive motor (20); wherein, fastening means (43)

are provided to operatively and releasably secure the filter member (40) to the drive motor (20).

Still referring to FIGS. 2 through u it can be seen that the central portion of the filter member (40) is suspended and supported within the air duct (100) by the combined cooperation of the filter hub element (41) and the drive motor shaft (21); wherein, the downstream peripheral edges of the filter member (40) are supported by the upstream surface of the framework member (30) surrounding the framework aperture (32).

As shown in FIG. 2 the vacuum unit (14) comprises a vacuum arm member (50) operatively and movably connected to the framework member (30); wherein, the bottom surface of the vacuum arm member (50) is provided with a plurality of staggered and spaced vacuum ports (51) which are adapted to collect debris from the upstream face of the filter member (40) as will be explained presently.

As can be seen by reference to FIGS. 1 and 3 the vacuum arm member (50) is radially aligned with the hub element (41) of the filter member (40); whereby, as the filter member (40) is rotated past the vacuum arm member (50) the entire upstream surface of the filter member (40) will be exposed to the effect of the vacuum suction generated through the vacuum ports (51) via a conventional vacuum motor (52) operatively connected to the vacuum arm member (50) in a well recognized fashion.

It should also be appreciated at this juncture that while the present invention was specifically developed for use with an electrostatic type filter member (40) which has an extremely long useful life, this system (10) may also be employed in conjunction with conventional replaceable filter members (40) which are normally discarded once the filter material has been clogged with debris, to substantially prolong the useful life of this particular type of filter member.

To that end it is therefore necessary for the vacuum arm member (50) to be movably mounted relative to the filter member (40) in much the same fashion as a phonograph needle arm and record were arranged relative to the turntable spindle, to allow the filter members (40) to be changed relative to the output shaft (21) of the drive motor (20).

As shown in FIGS. 2 both the vacuum motor (52) and the drive motor (20) are operatively connected to the control unit (15) which comprises a conventional electrical control box (60) having a single switch (61) to simultaneously actuate both the drive motor (20) and the vacuum motor (52) to effect the cleaning of the rotating filter member (40) via the vacuum arm member (40).

At this point it should also be apparent that the filter member (40) and framework member (30) are disposed at an angle within the air duct (100) to substantially increase the effective filtration surface area that is operatively deployed within the air duct (100).

Figure 5:
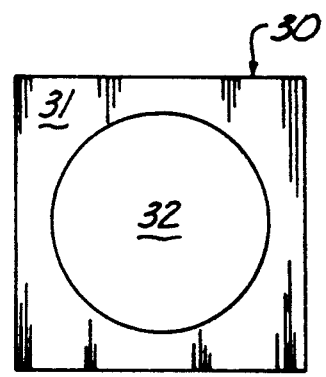
FIG. 5 is an isolated front plan view of the framework unit.

However, in the alternate embodiment of FIGS. 5 and 6 the motor drive (20) and the output shaft (21) are axially aligned with the longitudinal axis of the air duct (100); and, the framework member (30) and filter member (40) are both disposed perpendicular to the longitudinal axis of the air duct (100).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A rotating filter cleaning arrangement for deployment in a conventional air duct passageway; wherein, the arrangement comprises:
   a framework member having an enlarged generally circular aperture;
   a drive motor suspended from the framework member and having an output shaft axially aligned with the center of the enlarged circular aperture in the framework member;
   a generally thin, flat, circular filter member having a diameter approximately equal to, but greater than the diameter of the central aperture in the framework member; wherein, the filter member is further provided with a central hub element dimensioned to receive the output shaft of the drive member; and securing means for releasably fastening the hub element to the output shaft; and,
   a vacuum arm member operatively associated with the upstream surface of the filter member and further provided with a vacuum motor and a plurality of vacuum ports that are disposed proximate to an upstream surface of the filter member; wherein, the vacuum arm member is radially disposed relative to the central hub element of the filter member; wherein, the framework member has an elongated generally rectangular configuration; and, is further disposed at an acute angle within the air duct.

2. The arrangement as in claim 1; wherein, the downstream peripheral edge of the filter member is supported by the upstream surface of the framework member surrounding said central aperture.

3. The arrangement as in claim 1; wherein, the vacuum arm member is operatively and movably associated with said filter member to allow the replacement of the filter member.

4. The arrangement as in claim 1, further comprising:
   a control box operatively connected to both the drive motor and the vacuum motor; and further provided with a single switch which simultaneously actuates both of said motors.

5. A rotating filter cleaning arrangement for deployment in a conventional air duct passageway; wherein, the arrangement comprises:
   a framework member having an enlarged generally circular aperture;
   a drive motor suspended from the framework member and having an output shaft axially aligned with the center of the enlarged circular aperture in the framework member;
   a generally thin, flat, circular filter member having a diameter approximately equal to, but greater than the diameter of the central aperture in the framework member; wherein, the filter member is further provided with a central hub element dimensioned to receive the output shaft of the drive member; and securing means for releasably fastening the hub element to the output shaft;
   a vacuum arm member operatively associated with the upstream surface of the filter member and further provided with a vacuum motor and a plurality of vacuum ports that are disposed proximate to an upstream surface of the filter member; wherein, the vacuum arm member is radially disposed relative to the central hub element of the filter member; and, a control box operatively connected to both the drive motor and the vacuum motor; and further provided with a single switch which simultaneously actuates both of said motors.

6. The arrangement as in claim 5; wherein, the downstream peripheral edge of the filter ember is supported by the upstream surface of the framework member surrounding said central aperture.

7. The arrangement as in claim 5; wherein, the vacuum arm member is operatively and movably associated with said filter member to allow the replacement of the filter member.

* * * * *